US006464119B1

(12) United States Patent
O'Connell, Sr.

(10) Patent No.: US 6,464,119 B1
(45) Date of Patent: Oct. 15, 2002

(54) WHEELCHAIR MOUNT FOR SPARE TIRES

(76) Inventor: Raymond O'Connell, Sr., 1216 5th Pl., Port Hueneme, CA (US) 93041

( * ) Notice: Subject to any disclaimer, the term of this patent is extended or adjusted under 35 U.S.C. 154(b) by 0 days.

(21) Appl. No.: 09/829,150

(22) Filed: Apr. 9, 2001

(51) Int. Cl.[7] .................................................. B60R 9/00
(52) U.S. Cl. .................. 224/407; 224/42.15; 224/42.24
(58) Field of Search .............................. 224/407, 42.12, 224/42.15, 42.24

(56) References Cited

U.S. PATENT DOCUMENTS

| | | | | | |
|---|---|---|---|---|---|
| 2,754,974 | A | * | 7/1956 | Larson | 108/152 |
| 2,860,788 | A | * | 11/1958 | Hardman | 211/85.3 |
| 3,938,667 | A | * | 2/1976 | Buckland | 211/85.3 |
| 4,094,415 | A | * | 6/1978 | Larson | 211/57.1 |
| 5,407,170 | A | * | 4/1995 | Slivon et al. | 211/7 |
| 5,499,724 | A | * | 3/1996 | Hickman | 211/59.1 |
| 6,039,226 | A | * | 3/2000 | Brown et al. | 224/403 |
| 6,059,155 | A | * | 5/2000 | Young | 224/403 |

* cited by examiner

*Primary Examiner*—Stephen K. Cronin
(74) *Attorney, Agent, or Firm*—Goldstein & Lavas, P.C.

(57) ABSTRACT

A wheelchair mount for spare tires including an elongated bracket adapted for securement to a rear surface of a backrest of the wheelchair. A pair of support rods is secured to and extend outwardly from the elongated bracket. The pair of support rods includes an upper rod and a lower rod disposed in a spaced relationship. The upper rod serves to hold a front wheel of the wheelchair. The lower rod serves to hold a rear wheel of the wheelchair.

1 Claim, 4 Drawing Sheets

WHEELCHAIR MOUNT FOR SPARE TIRES

BACKGROUND OF THE INVENTION

The present invention relates to a wheelchair mount for spare tires and more particularly pertains to allowing spare tires for a wheelchair to be carried with the wheelchair for use when needed.

Many individuals require the use of a wheelchair. For non-ambulatory individuals, a wheelchair provides a convenient means of mobility. The smooth and continued operation of the wheelchair largely depends on the condition of the wheels. Typical wheelchairs have a pair of front wheels and a pair of rear wheels. The rear wheels are generally larger than the front wheels. On many wheelchair designs, the front and rear wheels are configured similarly to automobile tires whereby air is used to expand the wheels to a usable size. Unfortunately, as with automobile tires, the wheelchair wheels can be damaged to a point known as a "flat tire." This situation requires the wheel or tire to be changed. On automobiles, this is not a problem because most automobiles are equipped with a spare tire. The problem with wheelchairs exists in that they do not allow a spare wheel to be carried if such a problem arises. Thus, these exists a need for the means to carry spare wheels on a wheelchair in the event one of the wheels of the wheelchair is damaged.

The present invention attempts to solve the abovementioned problem by providing a bracket that can be mounted on a back of a wheelchair to hold spare wheels.

The use of wheelchair accessory devices is known in the prior art. More specifically, wheelchair accessory devices heretofore devised and utilized for the purpose of providing assistance to wheelchair users are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,785,218 to Laone discloses a mount assembly for a vehicle spare tire. U.S. Pat. No. 5,497,927 discloses an accessory support frame for a wheelchair.

While these devices fulfill their respective, particular objective and requirements, the aforementioned patents do not describe a wheelchair mount for spare tires for allowing spare tires for a wheelchair to be carried with the wheelchair for use when needed.

In this respect, the wheelchair mount for spare tires according to the present invention substantially departs from the conventional concepts and designs of the prior art, and in doing so provides an apparatus primarily developed for the purpose of allowing spare tires for a wheelchair to be carried with the wheelchair for use when needed.

Therefore, it can be appreciated that there exists a continuing need for a new and improved wheelchair mount for spare tires which can be used for allowing spare tires for a wheelchair to be carried with the wheelchair for use when needed. In this regard, the present invention substantially fulfills this need.

SUMMARY OF THE INVENTION

In the view of the foregoing disadvantages inherent in the known types of wheelchair accessory devices now present in the prior art, the present invention provides an improved wheelchair mount for spare tires. As such, the general purpose of the present invention, which will be described subsequently in greater detail, is to provide a new and improved wheelchair mount for spare tires which has all the advantages of the prior art and none of the disadvantages.

To attain this, the present invention essentially comprises an elongated bracket having a generally rectangular configuration. The bracket has a short upper edge, a short lower edge, and long opposed side edges. The bracket is adapted for securement to a rear surface of a backrest of the wheelchair. A pair of support rods is secured to and extend outwardly from the elongated bracket. The pair of support rods includes an upper rod and a lower rod disposed in a spaced relationship. The upper rod serves to hold a front wheel of the wheelchair. The lower rod serves to hold a rear wheel of the wheelchair.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wheelchair mount for spare tires which have all the advantages of the prior art wheelchair accessory devices and none of the disadvantages.

It is another object of the present invention to provide a new and improved wheelchair mount for spare tires which may be easily and efficiently manufactured and marketed.

It is a further object of the present invention to provide a new and improved wheelchair mount for spare tires which are of durable and reliable construction.

An even further object of the present invention is to provide a new and improved wheelchair mount for spare tires which are susceptible of a low cost of manufacture with regard to both materials and labor, and which accordingly is then susceptible of low prices of sale to the consuming public, thereby making such a wheelchair mount for spare tires economically available to the buying public.

Even still another object of the present invention is to provide a new and improved wheelchair mount for spare tires for allowing spare tires for a wheelchair to be carried with the wheelchair for use when needed.

Lastly, it is an object of the present invention to provide a new and improved wheelchair mount for spare tires including an elongated bracket adapted for securement to a rear surface of a backrest of the wheelchair. A pair of support rods is secured to and extend outwardly from the elongated bracket. The pair of support rods includes an upper rod and a lower rod disposed in a spaced relationship. The upper rod serves to hold a front wheel of the wheelchair. The lower rod serves to hold a rear wheel of the wheelchair.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
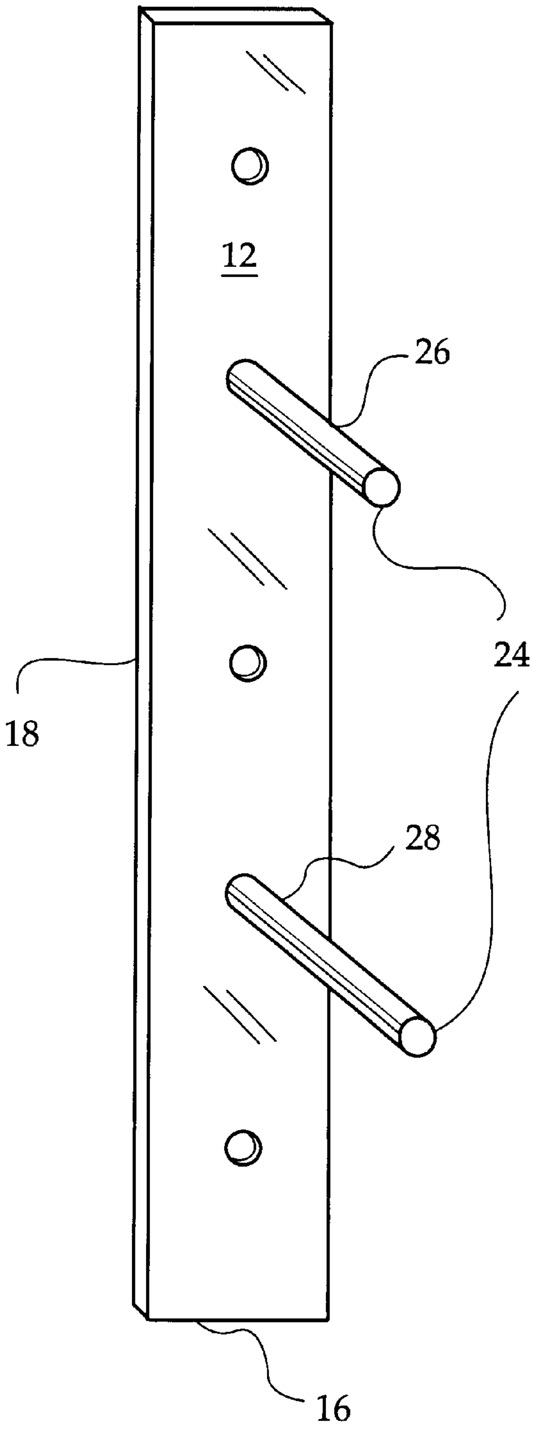
FIG. 1 is a perspective view of the preferred embodiment of the wheelchair mount for spare tires constructed in accordance with the principles of the present invention.

With reference now to the drawings, and in particular, to FIGS. 1 through four thereof, the preferred embodiment of the new and improved wheelchair mount for spare tires embodying the principles and concepts of the present invention and generally designated by the reference number 10 will be described.

Specifically, it will be noted in the various Figures that the device relates to a wheelchair mount for spare tires for allowing spare tires for a wheelchair to be carried with the wheelchair for use when needed. In its broadest context, the device consists of an elongated bracket and a pair of support rods. Such components are individually configured and correlated with respect to each other so as to attain the desired objective.

Figure 2:
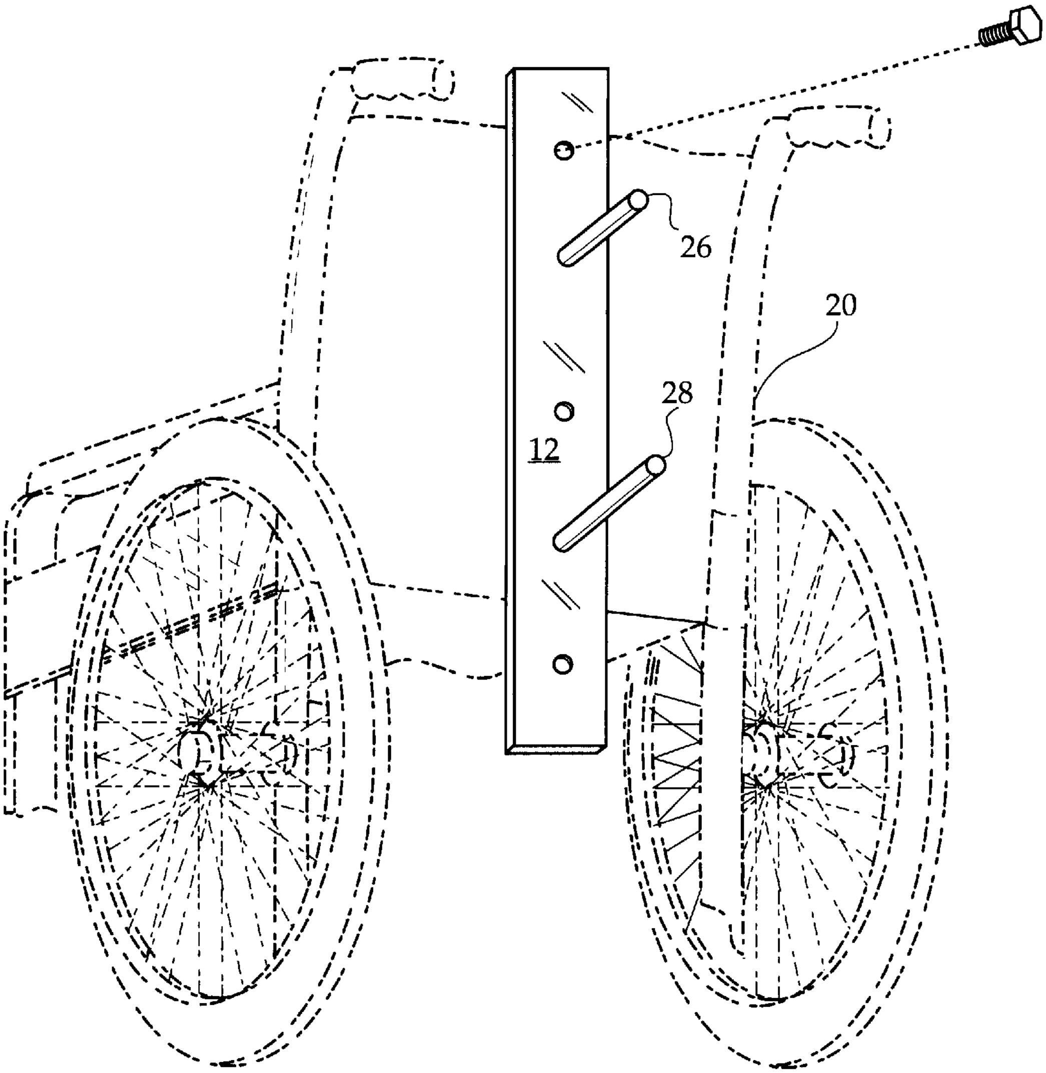
FIG. 2 is a perspective view of the present invention illustrated secured to the back of the wheelchair.
Figure 3:
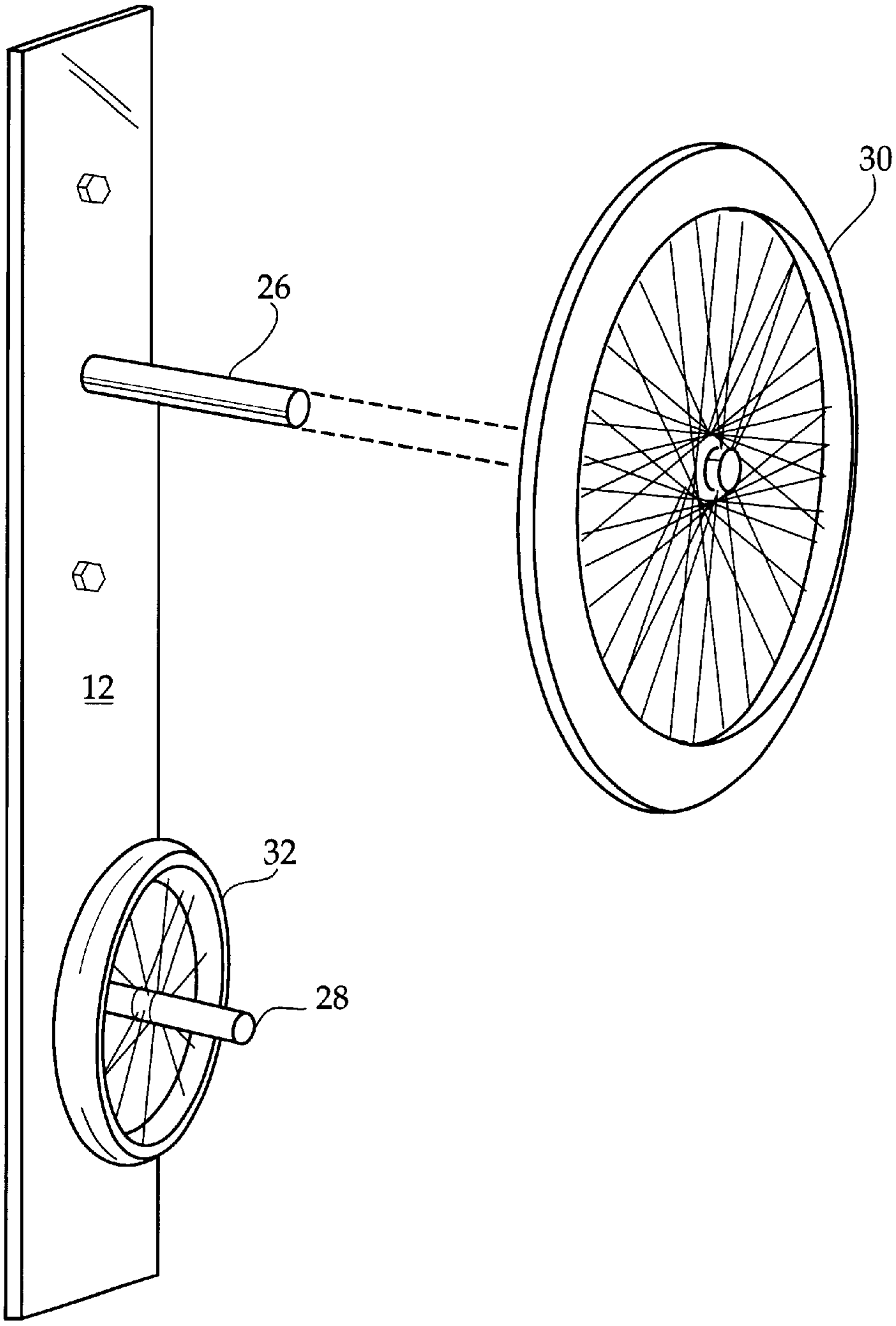
FIG. 3 is a perspective view of the present invention illustrating the attachment of the spare wheelchair wheels.

The elongated bracket 12 has a generally rectangular configuration. Note FIG. 1. The bracket 12 has a short upper edge 14, a short lower edge 16, and long opposed side edges 18. The bracket 12 is adapted for securement to a rear surface of a backrest 20 of the wheelchair 22. In the preferred embodiment, the elongated bracket 12 is secured to the backrest 20 by three equally spaced apart bolts or screws. Note FIG. 2.

Figure 4:
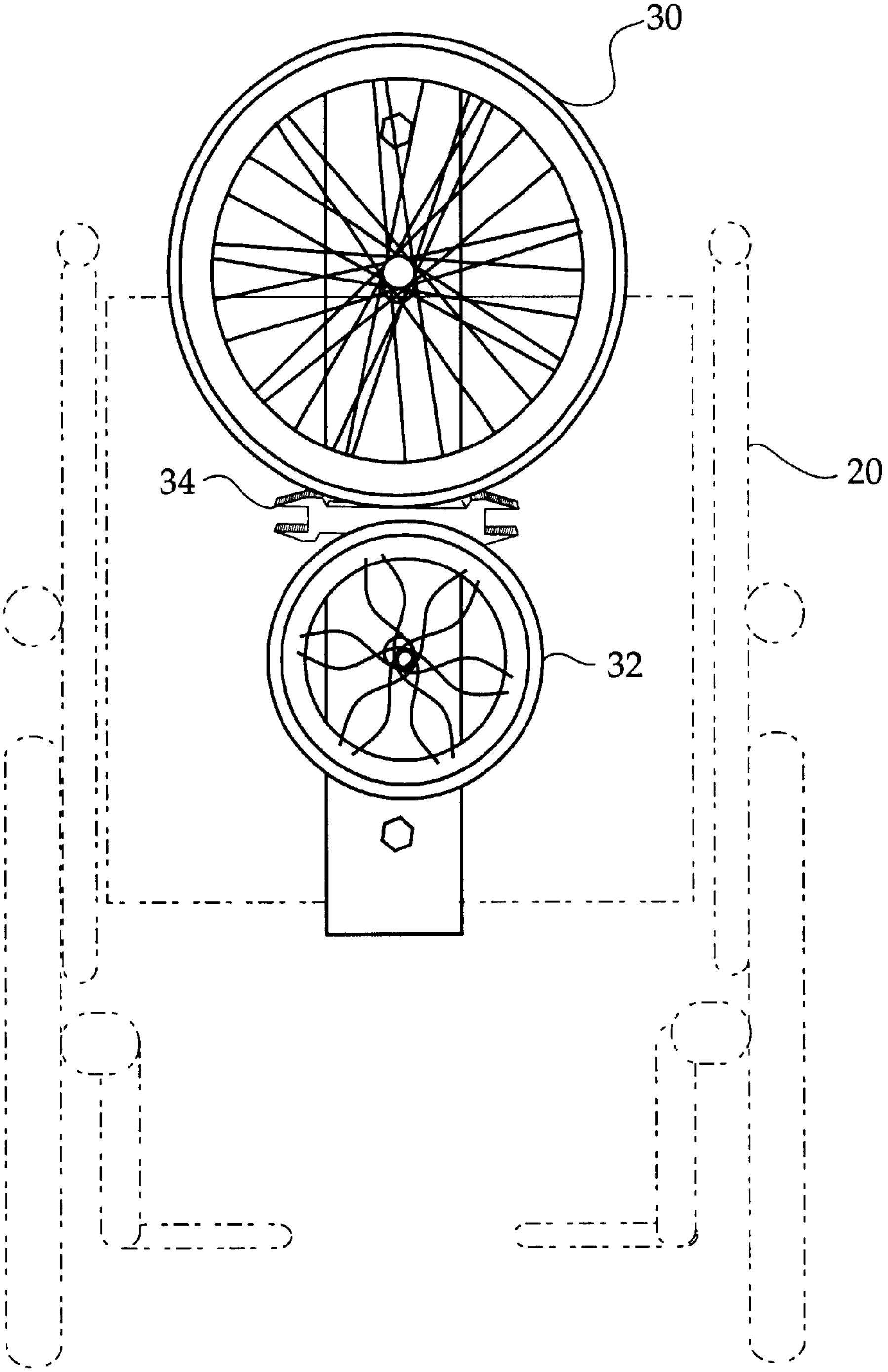
FIG. 4 is a perspective view of the present invention illustrated attached to the wheelchair with the spare wheels mounted thereon.

The pair of support rods 24 are secured to and extend outwardly from the elongated bracket 12. The pair of support rods 24 include an upper rod 26 and a lower rod 28 disposed in a spaced relationship. The upper rod 26 serves to hold a front wheel 30 of the wheelchair 22. The lower rod 28 serves to hold a rear wheel 32 of the wheelchair 22. Note figures three and four. When the front wheel 30 and rear wheel 32 are positioned on the corresponding rods 24, a sufficient space between the wheel's 30, 32 will exist to accommodate a lug wrench 34 or other tool needed to change the wheel's 30, 32 when necessary. Note FIG. 4.

The present invention will allow a person who uses a wheelchair to conveniently carry spare wheels with them in the event that something happens to one of their wheels during use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A wheelchair mount for spare tires for allowing spare tires for a wheelchair to be carried with the wheelchair for use when needed comprising, in combination:

a wheelchair comprising a seat portion, a backrest, and opposed front and rear wheels;

an elongated bracket having a generally rectangular configuration, the bracket having a short upper edge, a short lower edge, and long opposed side edges, the bracket being adapted for securement to a rear surface of the backrest of the wheelchair; and a pair of support rods secured to and extending outwardly from the elongated bracket, the pair of support rods including an upper rod and a lower rod disposed in a spaced relationship, the upper rod serving to hold the front wheel of the wheelchair, the lower rod serving to hold the rear wheel of the wheelchair.

* * * * *